(12) United States Patent
Weltzien

(10) Patent No.: US 12,457,998 B1
(45) Date of Patent: Nov. 4, 2025

(54) POULTRY COMBINED WATERING AND FEEDING DEVICE

(71) Applicant: Wagler Resources Inc., Montgomery, IN (US)

(72) Inventor: Ron Michael Weltzien, Galesville, WI (US)

(73) Assignee: Wagler Resources, Inc., Montgomery, IN (US)

( * ) Notice: Subject to any disclaimer, the term of this patent is extended or adjusted under 35 U.S.C. 154(b) by 61 days.

(21) Appl. No.: 16/798,358

(22) Filed: Feb. 22, 2020

Related U.S. Application Data

(60) Provisional application No. 62/809,357, filed on Feb. 22, 2019.

(51) Int. Cl.
*A01K 39/04* (2006.01)
*A01K 7/00* (2006.01)

(52) U.S. Cl.
CPC .............. *A01K 39/04* (2013.01); *A01K 7/005* (2013.01)

(58) Field of Classification Search
CPC ................................. A01K 39/04; A01K 7/005
USPC ......................................................... 119/51.5
See application file for complete search history.

(56) References Cited

U.S. PATENT DOCUMENTS

| | | | | |
|---|---|---|---|---|
| 2,457,159 A * | 12/1948 | Kofford | ............... | A01K 39/022 119/72.5 |
| 3,483,847 A * | 12/1969 | Kneubuehl | ............ | A01K 39/02 119/72.5 |
| 3,672,333 A * | 6/1972 | Bates | ........................ | A01K 7/02 119/51.5 |
| 3,800,746 A * | 4/1974 | Stidham | ............... | A01K 5/0208 119/56.1 |
| 4,221,188 A * | 9/1980 | Hostetler | .............. | A01K 39/022 119/72 |
| 4,337,728 A * | 7/1982 | Van Gilst | .................. | A01K 7/02 119/51.01 |
| 4,401,057 A * | 8/1983 | Van Gilst | .................. | A01K 5/02 119/51.11 |
| 4,476,811 A * | 10/1984 | Swartzendruber | ........................... | A01K 39/0125 119/53 |
| 4,527,513 A * | 7/1985 | Hart | ........................ | A01K 39/04 119/51.5 |
| 4,676,197 A * | 6/1987 | Hoover | ................ | A01K 5/0258 119/54 |
| 4,793,291 A * | 12/1988 | Hostetler | .............. | A01K 39/022 119/72.5 |
| 5,007,380 A * | 4/1991 | Badia | .................. | A01K 39/0125 119/53 |
| 5,092,274 A * | 3/1992 | Cole | ................... | A01K 39/0125 119/57.4 |
| 5,113,797 A * | 5/1992 | van Daele | .......... | A01K 39/0125 119/53 |

(Continued)

*Primary Examiner* — Kimberly S Berona
*Assistant Examiner* — Kevin M Dennis
(74) *Attorney, Agent, or Firm* — Liell & McNeil

(57) ABSTRACT

A combined poultry watering and feeding device that includes a poultry feed pan having an open end and a poultry feed support basin, a poultry feed drop tube connecting the poultry feed pan to a poultry feed line and providing the feed pan with access to poultry feed from the feed line, and at least one poultry drinking cup positioned above and within a diameter of the open end of the feed pan to allow the poultry feed pan to collect water spillage from the poultry drinking cup for poultry feed absorption.

6 Claims, 4 Drawing Sheets

(56) References Cited

U.S. PATENT DOCUMENTS

| | | | | |
|---|---|---|---|---|
| 5,199,382 A | * | 4/1993 | Adriano | A01K 39/0125 |
| | | | | 119/52.1 |
| RE34,494 E | * | 1/1994 | Kleinsasser | A01K 5/0241 |
| | | | | 119/51.5 |
| 5,996,530 A | * | 12/1999 | Miller | A01K 39/04 |
| | | | | 119/51.5 |
| 6,170,435 B1 | * | 1/2001 | Momont | A01K 39/04 |
| | | | | 119/51.5 |
| 2012/0318200 A1 | * | 12/2012 | Van Dyk | A01K 39/04 |
| | | | | 119/51.5 |
| 2015/0327510 A1 | * | 11/2015 | Romero | A01K 7/02 |
| | | | | 119/51.11 |

* cited by examiner

POULTRY COMBINED WATERING AND FEEDING DEVICE

FIELD OF THE INVENTION

This invention relates generally to poultry feeders and poultry watering systems and, more specifically, to a combined poultry water and feeding apparatus that prevents drinking water spillage onto the floor.

CROSS REFERENCE TO RELATED APPLICATIONS

This application claims priority to U.S. Provisional Application Ser. No. 62/809,357; filed on Feb. 22, 2019; titled POULTRY COMBINED WATERING AND FEEDING DEVICE.

STATEMENT REGARDING FEDERALLY SPONSORED RESEARCH OR DEVELOPMENT

None

REFERENCE TO A MICROFICHE APPENDIX

None

BACKGROUND OF THE INVENTION

Traditionally in the poultry industry there are separate feed lines and connecting dispensing systems and water lines and connecting dispensing systems in the poultry barns. However, this does not come without problems. When the birds drink from traditional water lines they tend to dribble and spill water as they drink. This spillage makes for wet floor surfaces which is an ideal environment for bacteria to thrive. The wet floor surfaces also create a less than ideal surface for the birds to walk on as wet floor surfaces may potentially lead to foot pad problems. The wet floor surfaces also lead to wet litter which results in higher ammonia levels in the air affecting air quality for the bird and for poultry employees.

The present invention comprises a combined water and poultry feeder directed to solve the problem of wet floors resulting from poultry drinking water spillage litter in poultry barns by catching all water spillage into the feed pan. The water spillage would combine or be absorb with the feed, thus eliminating wet litter and poor air quality. In addition, another benefit in equipping a barn with the combined water and turkey feeder of the present invention is that use of the present invention in poultry barns eliminates several rows of water lines, suspension, and countless hours of installation. A further benefit is that the present invention will provide increased useable square footage for the birds and their movement. Cleanout and wash-down of poultry barns would be easier for poultry employees.

SUMMARY OF THE INVENTION

Briefly, the present invention comprises a combined poultry watering and feeding device that includes a poultry feed pan having an enlarged open end and a poultry feed support basin, a poultry feed drop tube connecting the poultry feed pan to a poultry feed line and providing the feed pan with access to poultry feed from the poultry feed line, and at least one poultry drinking cup connected to the poultry feed drop tube with the poultry drinking cup positioned above and within a diameter of the open end of the feed pan allowing the poultry feed pan to collect water spillage from the poultry drinking cup for poultry feed absorption. The poultry drinking cup preferably includes a water spillage radius of less than and located within a radius of the open end of the feed pan.

The poultry drinking cup may include a trigger pin water activator connecting the poultry drinking cup to an on-demand water source and a water housing strap connecting the trigger pin water activator and the poultry drinking to the poultry feed drop tube. The poultry drinking cup may alternatively include a centrally located interior slot connecting the poultry drinking cup to an exterior surface of the poultry feed drop tube.

The present invention may also comprise a combined poultry watering and feeding device that includes a poultry feed pan having an enlarged open end and a poultry feed support basin, a poultry feed drop tube connecting the poultry feed pan to a poultry feed line and providing the poultry feed pan with access to poultry feed from the feed line and a poultry drinking cup connected to the poultry feed drop tube with the poultry drinking cup positioned above and within a diameter of the open end of the feed pan, the poultry drinking cup connected to an on-demand water source. The poultry drinking cup includes a water spillage radius of less than and located within a radius of the open end of the poultry feed pan to allow the poultry feed pan to collect water spillage from the poultry drinking cup for poultry feed absorption.

The poultry drinking cup may also include a centrally located interior slot located within the poultry drinking cup and having a conical-shaped sidewall connecting the poultry drinking cup to an exterior surface of the poultry feed drop tube. The poultry drinking cup may further includes a splashguard connected to the poultry feed drop tube with the splashguard extending above the poultry drinking cup to reduce water spillage from the poultry drinking cup due to splashing while simultaneously providing live poultry access to water located within the poultry drinking cup.

DESCRIPTION OF THE PREFERRED EMBODIMENT

Figure 1:
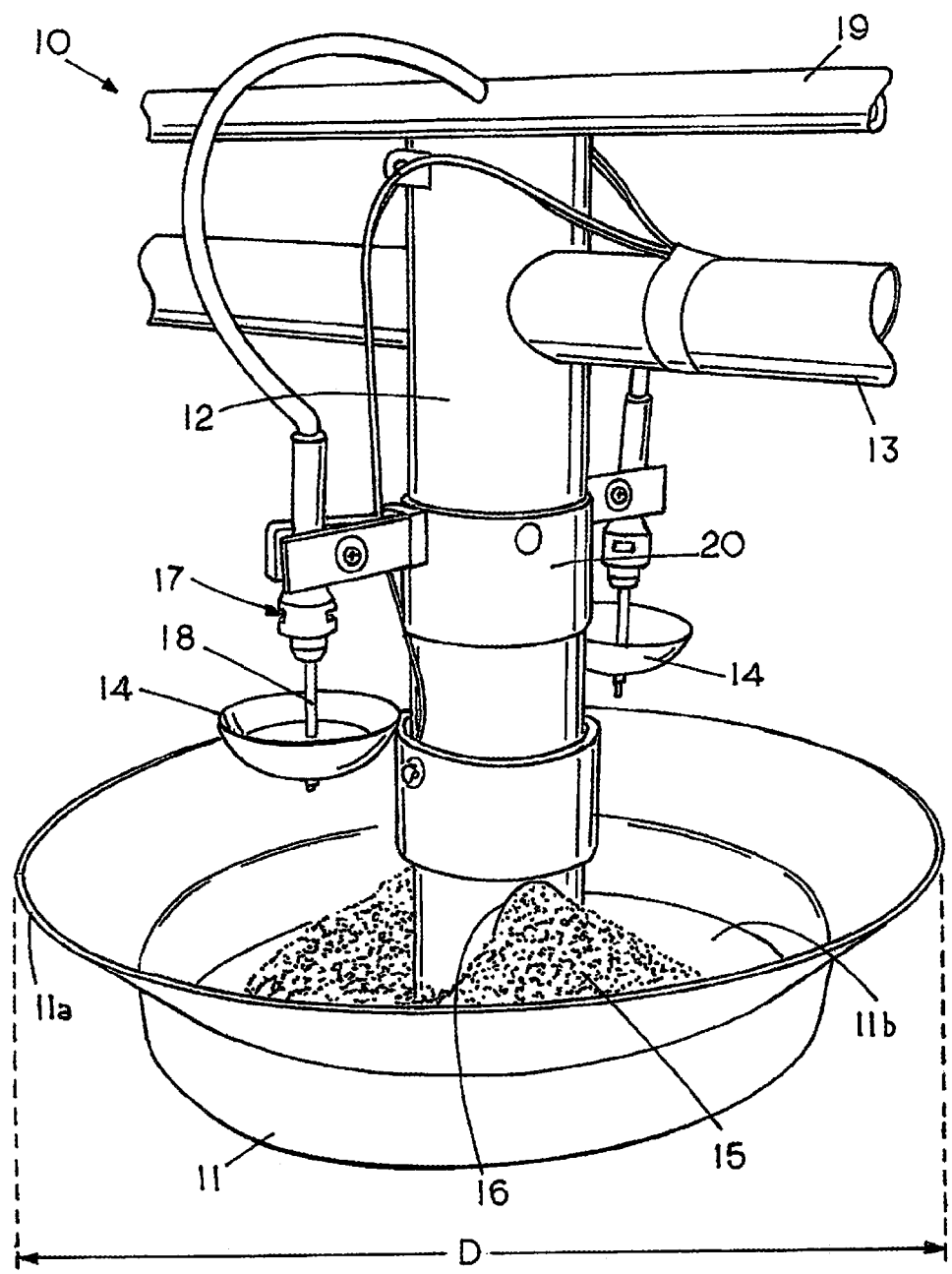
FIG. 1 is a perspective view showing an embodiment of a combined poultry watering and feeding device that prevents drinking water spillage onto the floor.

The general purpose of the present invention, which will be described subsequently in greater detail, is to solve the problem of wet litter in poultry barns by providing for a combined water and turkey feeder that is designed to catch all water spillage into the feed pan. Any potential splashing from the spill is controlled or eliminated by the water spill being absorbed or combine with the feed, thus eliminating wet litter and poor air quality.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

FIG. 1 is a perspective view showing an embodiment of a combined poultry watering and feeding device 10 of the present invention which generally includes a poultry feed pan 11 having an open end and preferably an enlarged open end 11a, a poultry feed support basin 11b, a poultry feed drop tube 12 connecting the poultry feed pan 11 to a poultry feed line 13, and at least one poultry drinking cup. Poultry feed line 13 traditionally comprises a conveyor tube within which a conveyor cable and associated conveyor disks are moved to convey feed through the conveyor tube, poultry feed drop tube 12 to provide the feed pan 11 with access to poultry feed 15 from the feed line 13 such as via a feed opening 16 located on poultry feed drop tube 12. The conveyor tube is normally suspended from above the poultry barn and is height adjustable relative to the floor of the housing facility to accommodate the change in height of the birds as they mature.

Although alternative embodiments of the present invention may include the use of as few as one to a plurality of poultry drinking cup, the embodiment of FIG. 1 shows the combined poultry watering and feeding device 10 having a pair of preferably equally spaced poultry drinking cups 14.

A feature of the present invention is that each of the poultry drinking cups 14 is positioned above and within a diameter "D" of the open end 11a of the poultry feed pan 11 to allow the poultry feed pan 11 to collect water spillage from the poultry drinking cups 14 so that the birds may have immediate additional access to the water from the poultry feed pan 11 and for the eventual absorption of the water by the poultry feed 15 supported on basin 11b thereby eliminating wet floor surfaces resulting from water spillage thereby greatly reducing or even eliminating wet litter and poor air quality.

In the embodiment of FIG. 1 each of the poultry drinking cups 14 of the poultry watering and feeding device 10 is shown having a trigger pin water activator 17 attached to the poultry drinking cup 14 by a trigger pin 18. Trigger pin water activator 17 functions to connect the poultry drinking cup 14 to an on-demand water source such as water line 19. In the embodiment of FIG. 1 the trigger pin water activator 17 and the poultry drinking cup 14 are shown attached to the poultry feed drop tube 12 by a water housing strap 20. It is noted that alternative devices may be used to trigger pin water activator 17 and poultry drinking cup 14 to the poultry feed drop tube 12 without deviating from the scope of the present invention.

Figure 2:
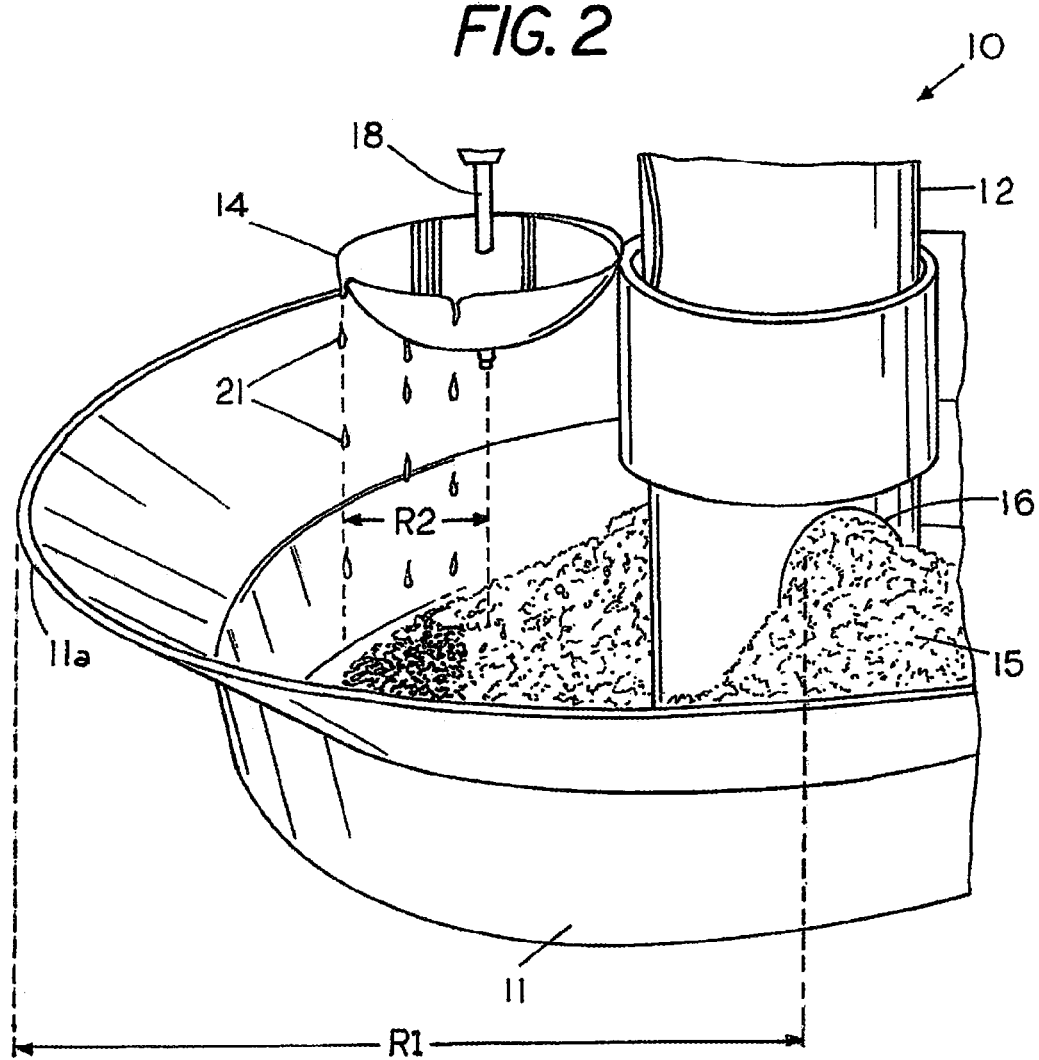
FIG. 2 is a close-up perspective view showing the collection of a water spillage by a poultry feed pan from poultry drinking cup.

FIG. 2 is a close-up perspective view showing the collection of a water spillage 21 by poultry feed pan 11 from poultry drinking cup 14 resulting from an over-flow of water from drinking cup 14. In order to effectively collect as much of the water spillage from poultry drinking cup 14 as possible, the poultry drinking cup 14 preferably includes a water spillage radius length "R2" that is less than a radius length "R1" of the open end 11a of the poultry feed pan 11 with the water spillage radius length "R2" of the poultry drinking cup 14 located within the radius length "R1" of the open end of the feed pan. Referring to FIGS. 1 and 2, in the operation of the combined poultry watering and feeding device 10, the bird may obtain water by leaning their heads or beaks against the trigger pin 18 causing the displacement of the trigger pin 18 which opens an internal valve of the trigger pin water activator 17 which leads to the dispensing of water from the water line 19 for poultry drinking purposes. Water is dispensed and collected by the poultry drinking cup 14. The bird, in general, will stop pushing on the trigger pin 18 at some point after the sufficient water has been collected from the poultry drinking cup 14 and start drinking water therefrom thereby resulting in the internal valve of the trigger pin water activator 17 moving back to a closed condition resulting in the suspension of water being dispensed from the water line 19.

While water is being dispensed and/or while the birds are drinking the water from the poultry drinking cup 14, some water will invariably be spilled from the poultry drinking cup 14. A feature of the present invention of the poultry drinking cup 14 being positioned above and within the diameter of the open end 11a of the poultry feed pan 11 and with the water spillage radius length "R2" of less than and located within the radius length "R1" of the open end 11a of the poultry feed pan 11 allows the poultry feed pan 11 to collect water spillage from the poultry drinking cup 14 for eventual bird consumption either through the bird's direct drinking of the water collected by the poultry feed pan 11 or by the birds' consumption of water that has been absorbed by the poultry feed 15 supported within the poultry feed pan 11 thereby preventing water from falling or being spilled onto the barn floor.

The combined poultry watering and feeding device 10 of the present invention thus solves the problem of wet litter in poultry barns by providing for a combined water and poultry feeder 10 that is designed to catch all water spillage into the poultry feed pan 11. Any potential splashing from the spill is controlled or eliminated by the water spill being absorbed or combined with the feed 15, thus eliminating wet litter and poor air quality. In addition, another benefit in equipping a barn with the combined poultry watering and feeding device 10 is that use of the combined poultry watering and feeding device 10 will eliminate several rows of water lines, suspension, and countless hours of installation. A further benefit in using the combined poultry watering and feeding device 10 is that it will lead to increased useable square footage for the birds and their movement. Cleanout and wash-down of poultry barns would be easier for poultry employees.

Figure 3:
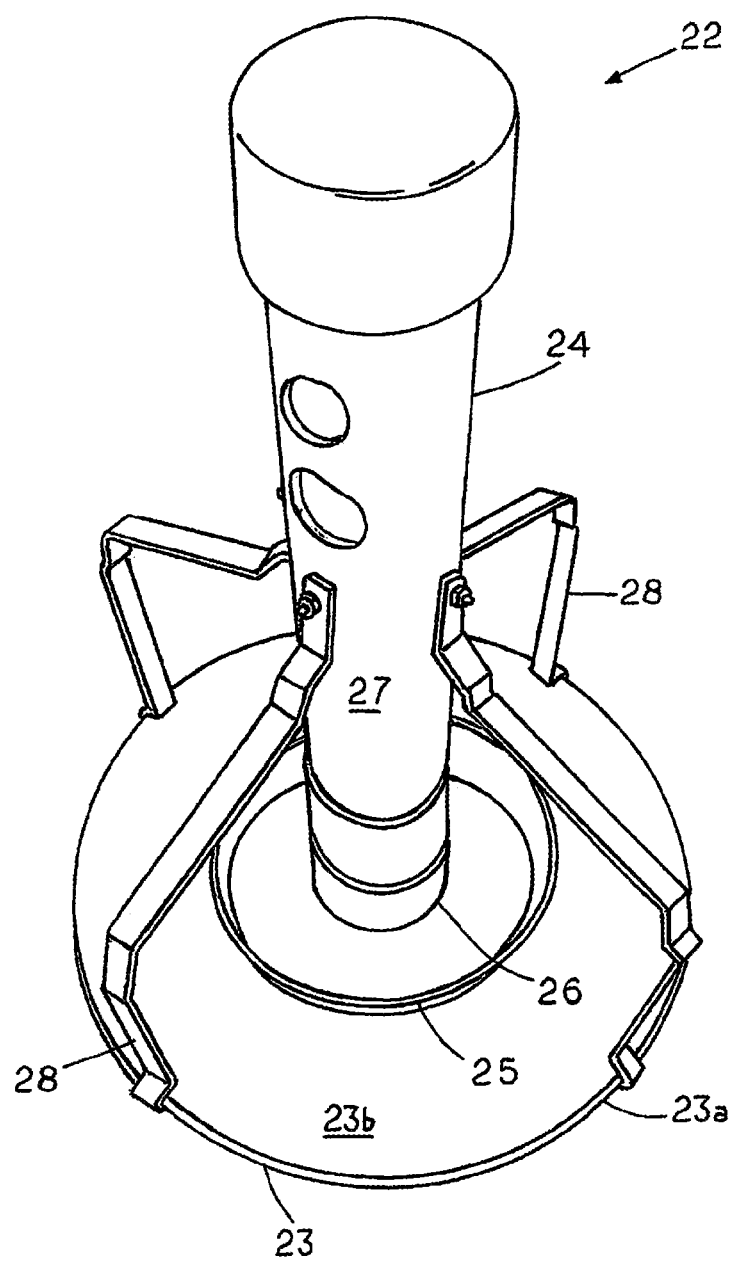
FIG. 3 is a perspective view showing an alternative embodiment of a combined poultry watering and feeding device.

FIG. 3 is a perspective view showing an alternative embodiment of a combined poultry watering and feeding device 22 of the present invention. Combined poultry watering and feeding device 22 includes general components similar to the combined poultry watering and feeding device 10, namely a poultry feed pan 23 having an open end 23a and a poultry feed support basin 23b, a poultry feed drop tube 24 connecting the poultry feed pan 23 to a poultry feed line (not shown) to provide the poultry feed pan 23 with access to poultry feed 15 from the feed line, and a poultry drinking cup 25 positioned above and within a diameter of the open end 23a of the poultry feed pan 23 to allow the poultry feed pan 23 to collect water spillage from the poultry drinking cup 25 for poultry feed absorption.

Unlike the poultry drinking cups 14 of combined poultry watering and feeding device 10, poultry drinking cup 25 is shown having a centrally located interior slot 26 connecting the poultry drinking cup 25 to an exterior surface 27 of the poultry feed drop tube 24.

In the embodiment of FIG. 3 the poultry feed pan 23 is shown connected to the poultry feed drop tube 24 by four evenly spaced support brackets 28 which also provides vibrational stability to poultry feed pan 23. It is noted that alternative embodiments of the present invention may include the use of as few as two to a plurality of evenly spaced support brackets.

Figure 4:
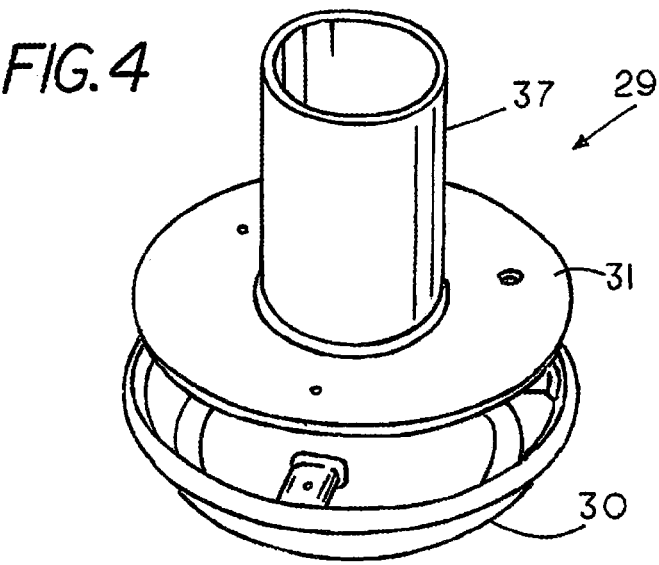
FIG. 4 is a perspective view showing a poultry drinking cup assembly.
Figure 5:
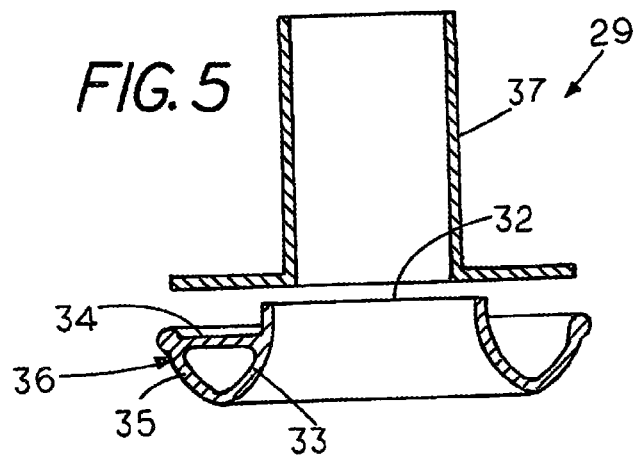
FIG. 5 is a cross-sectional view of the poultry drinking cup assembly of FIG. 4.
Figure 6:
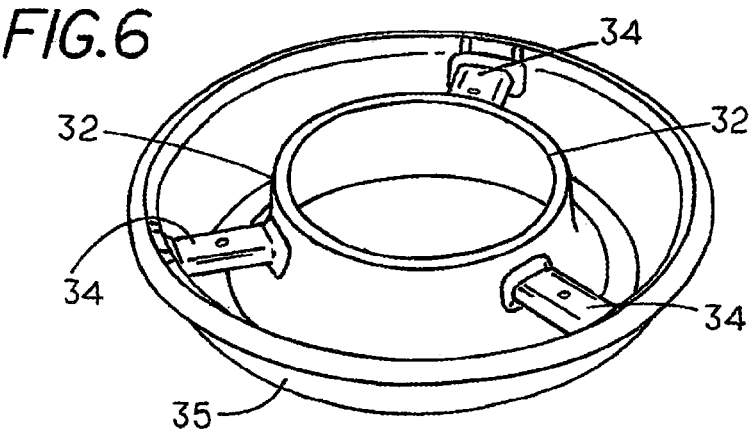
FIG. 6 is a perspective view showing poultry drinking cup of the poultry drinking cup assembly of FIG. 4.

Referring to FIGS. 4, 5 and 6, FIG. 4 is a perspective view and FIG. 5 is a cross-sectional view showing an alternative embodiment of a poultry drinking cup assembly 29 of the present invention which generally comprises a poultry drinking cup 30 and a splash guard 31. FIG. 6 is a perspective view showing poultry drinking cup 30. Similar to the poultry drinking cup 25 of FIG. 3, the poultry drinking cup 30, in use, is positioned above and within a diameter of an open end of a poultry feed pan to allow the poultry feed pan to collect water spillage from the poultry drinking cup 25.

The poultry drinking cup 30 includes a centrally located interior slot 32 located within the poultry drinking cup 29 and having a conical-shaped sidewall 33 connecting the poultry drinking cup 29 to an exterior surface of the poultry feed drop tube. The poultry drinking cup 30 is shown in FIG. 6 including 3 equally spaced cross members 34 each connecting the conical-shaped sidewall 33 with an exterior wall 35 of the poultry drinking cup 30 to form a gusset-shaped cross section 36 as shown in FIG. 5, which functions to provide poultry drinking cup 30 with increase structural support.

The splashguard 31 includes a funnel 37 extending at a perpendicular angle with respect to the splashguard 31. The funnel 37 functions to connect the splashguard 31 to the poultry feed drop tube with the splashguard 31 positioned above and proximal to the poultry drinking cup 30 to reduce water spillage from the poultry drinking cup 30 due to splashing while simultaneously providing live poultry access to water located within the poultry drinking cup 30. In use the poultry drinking cup 30 includes a water spillage radius of less than a radius of the open end of the feed pan with the water spillage radius of the poultry drinking cup 30 located within the radius of an open end of the feed pan to allow the poultry feed pan to collect water spillage from the poultry drinking cup for poultry feed absorption.

I claim:

1. A combined poultry watering and feeding device comprising:
    a poultry feed pan having an open end and a poultry feed support basin;
    a poultry feed drop tube connecting said poultry feed pan to a poultry feed line and providing said feed pan with access to poultry feed from said feed line; and
    at least one poultry drinking cup located underneath and proximal to an outlet of a water line, said at least one poultry drinking cup collecting a volume of water dispensed from said water line before poultry drinks said water dispensed from said water line, said at least one poultry drinking cup positioned above and within a diameter of said open end of said feed pan to allow said poultry feed pan to collect water spillage from said at least one poultry drinking cup for bird consumption and poultry feed absorption while preventing said spillage from contacting a floor surface;
    said at least one poultry drinking cup includes a water spillage radius of less than and located within a radius of said open end of said feed pan;
    said at least one poultry drinking cup includes an animal activated trigger pin water activator connecting said at least one poultry drinking cup to an on-demand water source.

2. The combined poultry watering and feeding device of claim 1 wherein said at least one poultry drinking cup comprises two poultry drinking cups each positioned above and within said diameter of said open end of said feed pan.

3. The combined poultry watering and feeding device of claim 2, including a water housing strap connecting said trigger pin water activator and said at least one poultry drinking cup to said poultry feed drop tube.

4. A combined poultry watering and feeding device comprising:
    a poultry feed pan having an enlarged open end and a poultry feed support basin;
    a poultry feed drop tube connecting said poultry feed pan to a poultry feed line and providing said feed pan with access to poultry feed from said feed line; and
    at least one poultry drinking cup connected to said poultry feed drop tube, said at least one poultry drinking cup directly connected to an on-demand water source, said at least one poultry drinking cup collecting a volume of water dispensed from said water source before poultry drinks said water dispensed from said water source, said at least one poultry drinking cup positioned above and within a diameter of said open end of said feed pan allowing said poultry feed pan to collect water spillage from said at least one poultry drinking cup for bird consumption and poultry feed absorption while preventing said spillage from contacting a floor surface;

said at least one poultry drinking cup includes a water spillage radius of less than and located within a radius of said open end of said feed pan;

said at least one poultry drinking cup includes an animal activated trigger pin water activator connecting said at least one poultry drinking cup to the on-demand water sources.

5. The combined poultry watering and feeding device of claim 4 including a water housing strap connecting said trigger pin water activator and said at least one poultry drinking cup to said poultry feed drop tube.

6. The combined poultry watering and feeding device of claim 4 wherein said at least one poultry drinking cup comprises two poultry drinking cups each positioned above and within said diameter of said open end of said feed pan.

* * * * *